United States Patent
Kaiser

(10) Patent No.: US 8,769,330 B2
(45) Date of Patent: Jul. 1, 2014

(54) DYNAMIC VOLTAGE AND FREQUENCY SCALING TRANSITION SYNCHRONIZATION FOR EMBEDDED SYSTEMS

(76) Inventor: Adam Kaiser, Everett, WA (US)

(*) Notice: Subject to any disclaimer, the term of this patent is extended or adjusted under 35 U.S.C. 154(b) by 321 days.

(21) Appl. No.: 13/050,900

(22) Filed: Mar. 17, 2011

(65) Prior Publication Data

US 2011/0239007 A1    Sep. 29, 2011

Related U.S. Application Data

(60) Provisional application No. 61/314,719, filed on Mar. 17, 2010.

(51) Int. Cl.
  *H03L 7/00* (2006.01)
(52) U.S. Cl.
  USPC ............ 713/401; 713/400; 713/502; 327/141; 327/149; 327/153; 327/158; 327/161
(58) Field of Classification Search
  USPC .......... 713/400–401, 502; 327/141, 149, 153, 327/158, 161
  See application file for complete search history.

(56) References Cited

U.S. PATENT DOCUMENTS

| | | | | |
|---|---|---|---|---|
| 8,051,320 B2* | 11/2011 | Knoth | ............................ | 713/503 |
| 8,183,899 B2* | 5/2012 | Kanno et al. | ................... | 327/149 |
| 8,341,439 B2* | 12/2012 | Kim et al. | ....................... | 713/300 |
| 8,381,009 B2* | 2/2013 | Priel et al. | ...................... | 713/401 |
| 8,392,746 B2* | 3/2013 | Knoth | ............................ | 713/503 |
| 2008/0256551 A1* | 10/2008 | Priel et al. | ...................... | 718/108 |
| 2009/0158078 A1* | 6/2009 | Knoth | ............................ | 713/503 |
| 2009/0315601 A1* | 12/2009 | Priel et al. | ...................... | 327/161 |
| 2010/0019818 A1* | 1/2010 | Priel et al. | ...................... | 327/276 |
| 2010/0117697 A1* | 5/2010 | Kanno et al. | ................... | 327/158 |
| 2012/0036380 A1* | 2/2012 | Knoth | ............................ | 713/322 |
| 2012/0187993 A1* | 7/2012 | Kanno et al. | ................... | 327/158 |

* cited by examiner

*Primary Examiner* — M Elamin

(74) *Attorney, Agent, or Firm* — Mentor Graphics Corporation

(57) ABSTRACT

Methods and apparatuses are provided that allow for the synchronization of an operating point transition in an embedded system environment. Identification of an upcoming operating point transition, operating point transition constraints, and maximum parking latency parameters is provided. Then, an ordering of seizing bus activity as well as an ordering of resuming bus activity is determined. The operating point transition is then implemented using the determined ordering. Simulation and determination of change of successfully completing operating point transition prior to initiating and while the transition is pending are also provided.

20 Claims, 5 Drawing Sheets

DYNAMIC VOLTAGE AND FREQUENCY SCALING TRANSITION SYNCHRONIZATION FOR EMBEDDED SYSTEMS

RELATED APPLICATIONS

This application claims priority under 35 U.S.C. §119(e) to U.S. Provisional Patent Application No. 61/314,719 entitled "DVFS Transitions Synchronization for Embedded System Design," filed on Mar. 17, 2010, and naming Adam Kaiser as inventor, which application is incorporated entirely herein by reference.

FIELD OF THE INVENTION

This invention relates to the field of embedded system design. Various implementations of the invention are applicable to synchronizing hardware resources for dynamic voltage and frequency scaling transitions of an embedded system.

BACKGROUND OF THE INVENTION

In general, an embedded system may be described as a special purpose computing system designed to perform one or a few dedicated functions. Embedded systems are commonly used in consumer devices like personal digital assistants, mobile phones, videogame consoles, microwaves, washing machines, alarm systems, and digital cameras. In addition to the consumer space, embedded systems are used in nearly every industry, from telecommunications to manufacturing, and from transportation to medical devices. In fact, embedded systems are so commonly in use today that it is not feasible to exhaustively list specific examples.

The term "embedded system" does not have a precise definition, and determining what is and is not an embedded system can be difficult. For example, a general purpose computer, such as a laptop, is not typically characterized as an embedded system. However, a laptop is usually composed of a multitude of subsystems such as the hard disk drive, the motherboard, the optical drive, the video processing unit, and various communication devices. Many of the individual subsystems comprising the laptop may themselves be embedded systems.

The complexity of embedded systems can vary from, for example, systems with a single microcontroller chip and a light emitting diode to systems with multiple microprocessor units and various peripheral communication interfaces and mechanical parts. Manufacturers of modern microprocessors are increasingly adding components and peripheral modules to their microprocessors, creating what may be thought of as embedded processors. This type of embedded system is often referred to as a system on a chip (SoC). A simple example of a system on chip is an application-specific integrated circuit (ASIC) packaged with a universal serial bus (USB) port. Additionally, embedded systems range from those having no user interface at all to those with full user interfaces similar to a desktop operating system.

There are many advantages to using embedded systems. For example, an embedded system typically is designed to do some specific task, as opposed to being a general purpose computer with a wide range of features for performing many different tasks. As a result, design engineers can optimize the embedded system for the desired task, which assists in reducing the size and cost of the device as well as increasing its reliability and performance. Furthermore, functionalities can be designed into an embedded system that would not be feasible using hardware alone.

The software that operates an embedded system is generally referred to as "firmware." Firmware is often stored on read only memory ("ROM") based storage devices. For example, flash-based read only memory or electronically erasable read only memory ("EEPROM") devices are often used to store firmware. The firmware is used to control the various features, functioning, and interfaces of the embedded system. Thus, a digital video disk player will have firmware that processes the appropriate response to an input, such as the user pressing the "power" button or the "play" button. Additionally, the firmware in this example would control the storage mechanism, the digital processing circuitry used to decode and output onto the appropriate ports the video and audio signals stored on the video storage medium, as well as the user interface allowing the user to configure settings of the digital video disk player.

Many embedded systems include among their hardware components a processing unit, which is capable of executing software instructions stored on a computer-readable medium. As those of skill in the art will appreciate, some of these processing units are capable of dynamically scaling their frequency or voltage settings or both. This capability is commonly referred to as dynamic voltage and frequency scaling (DVFS). Dynamic voltage and frequency scaling is typically implemented to achieve certain efficiencies, such as, for example, lower power consumption and lower heat generation.

Most modern processing units include the ability to synchronize the frequency and voltage transitions within the processing unit itself. However, various other hardware components that share a data bus that has its frequency change may require synchronization. Additionally, hardware components that share a voltage rail which has its voltage change may also require synchronization.

SUMMARY OF THE INVENTION

Various implementations of the invention provide methods and apparatuses for synchronizing a dynamic voltage and frequency transition in an embedded system.

In various implementations of the invention, an upcoming operating point transition is detected. Additionally, operating point transition constraints and maximum parking latency parameters are identified. Then, an order of seizing bus activity and an order of resuming bus activity are determined. Subsequently, the operating point transition is initiated.

With various implementations, the operating point transition is simulated using the operating point transition constraints, the maximum parking latency parameters, and the determined orderings. The operating point transition may then either be imitated or not based upon the simulation. Additionally, the chance of successfully completing the transition may be simulated as the transition proceeds. The transition may then either be allowed to continue and may be aborted based upon the simulation results.

These and additional aspects of the invention will be further understood from the following detailed disclosure of illustrative embodiments.

BRIEF DESCRIPTION OF THE DRAWINGS

The present invention will be described by way of illustrative embodiments shown in the accompanying drawings in which like references denote similar elements, and in which.

DETAILED DESCRIPTION OF ILLUSTRATIVE EMBODIMENTS

The operations of the disclosed implementations may be described herein in a particular sequential order. However, it should be understood that this manner of description encompasses rearrangements, unless a particular ordering is required by specific language set forth below. For example, operations described sequentially may in some cases be rearranged or performed concurrently. Moreover, for the sake of simplicity, the illustrated flow charts and block diagrams typically do not show the various ways in which particular methods can be used in conjunction with other methods.

It should also be noted that the detailed description sometimes uses terms like "generate" to describe the disclosed implementations. Such terms are often high-level abstractions of the actual operations that are performed. The actual operations that correspond to these terms will often vary depending on the particular implementation.

Illustrative Embedded System

Figure 1:
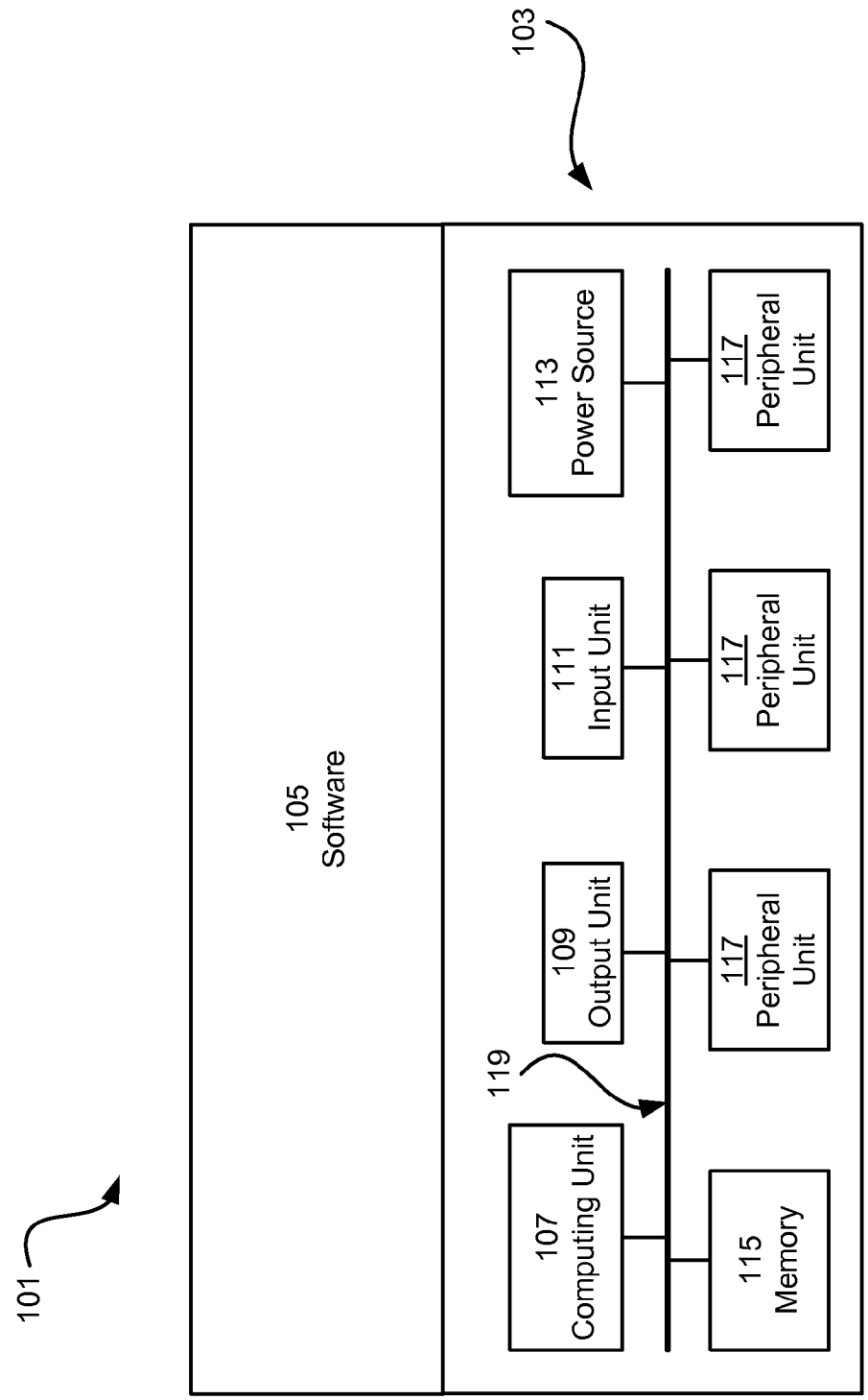
FIG. 1 illustrates an embedded system.

As the techniques of the present invention are directed towards synchronizing a dynamic voltage and frequency transition in an embedded system, an illustrative embedded system is described herein. FIG. 1 illustrates an embedded system 101. As can be seen from this figure, the embedded system 101 includes both hardware 103 and software 105. As illustrated, the hardware 103 includes a computing unit 107, an output unit 109, an input unit 111, a power source 113, a memory 115 and a number of peripheral units 117. Those of skill in the art will appreciate that not all embedded systems include the features illustrated in FIG. 1. Furthermore, additional features, not illustrated in FIG. 1, may be present in an embedded system. For example, as stated above, an embedded system may be configured as a cell phone. Accordingly, peripheral units 117 configured for cellular communication may be included in the embedded system 101. As can be further seen from this figure, the various components of the embedded system are interconnected via a bus 119.

The software 105, which may also be referred to as the "firmware" or the "operating system" (OS), is typically stored on a non-transient memory component. More particularly, the software 105 may be stored on the memory 115. In this manner, the functionality "programmed" into the software 105 may be accessed and used to interact with and control the hardware 103 of the embedded system 101. This typically involves causing various portions of the software 105 to be executed by the computing unit 107.

As those of skill in the art will appreciate, a computing unit 107 has a particular operating point. The operating point often includes a voltage component and a frequency component. As stated above, many computing units provide for the dynamic adjustment of the operating points. More specifically, the voltage supplied to the computing unit, the frequency driving the computing unit, or both, may be adjusted in on-the-fly. That is to say, that the operating point may be adjusted without powering off the computing unit.

As indicated above, when a computing unit transitions from one operating point to another, it may be necessary to synchronize the transition with other hardware components in the system. As will be appreciated by those of skill in the art, where such transitions are not synchronized various negative effects may manifest in the system. One example of a negative effect is that communication between the computing unit and the unsynchronized component may be disrupted.

Operating Point Transition Synchronization

Figure 2:
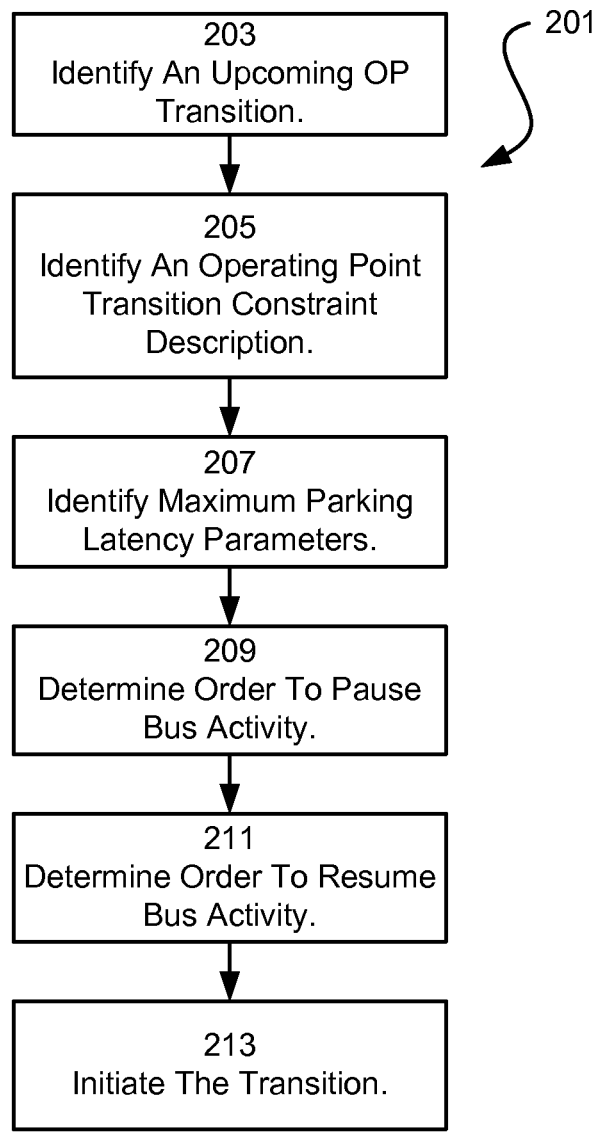
FIG. 2 illustrates a method for synchronizing operating point transitions that may be provided by various implementations of the invention.
Figure 3:
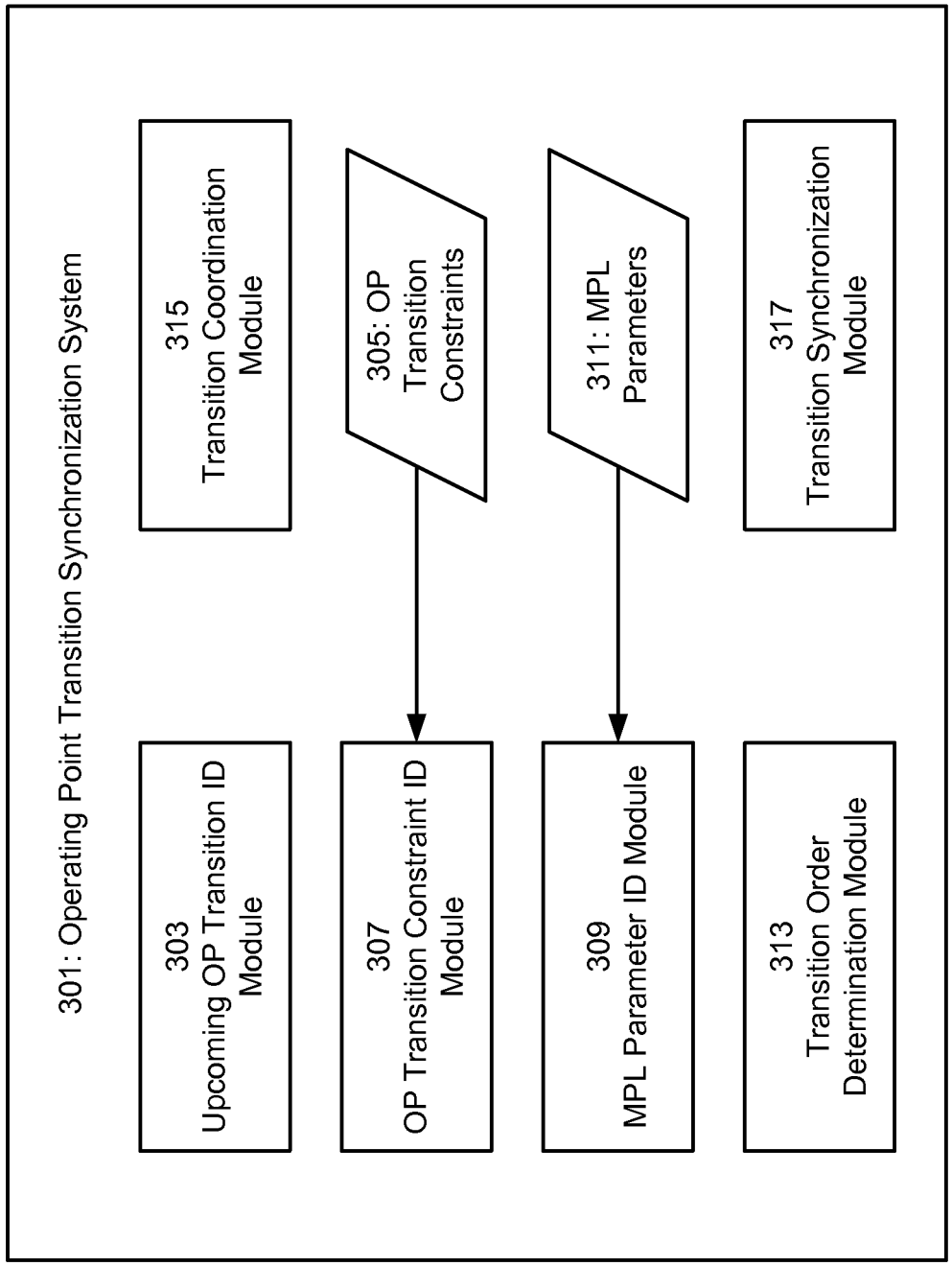
FIG. 3 illustrates an embedded system including an operating point transition synchronization component that may be provided by various implementations of the present invention.

FIG. 2 illustrates a method for synchronizing an operating point transition, which may be provided by various implementations of the invention. FIG. 3 illustrates a system for synchronizing an operating point transition that may be provided by various implementations of the present invention. Reference to both FIG. 2 and FIG. 3 will be made below in describing various implementations of the present invention.

As can be seen from this figure, the method 201 includes an operation 203 for identifying an upcoming operating point transition. Operating point transitions may be initiated by a number of processes. For example a user of the system may initiate a transition from a lower operating point to a higher operating to achieve a greater overall feel of responsiveness from the system. Additionally, certain programs may initiate a transition from a lower operating point to a higher operating point to achieve a greater rate of computation by the computing unit. In other cases, a transition from a higher operating point to a lower operating point may be initiated by a power consumption monitoring program to achieve a lower power consumption rate.

The system 301 shown in FIG. 3 includes an upcoming operating point transition identification module 303. In various implementations, the module 303 may be implemented as a service running on the software of an embedded system. Alternatively, the module 303 may be implemented as a part of the computing unit of the embedded system itself. In either case. The module 303 identifies upcoming operating point transitions, which may be initiated as described above.

The method 201 further includes an operation 205 for identifying an operating point transition constraint description corresponding to the computing unit to which the transition is to be applied. As those of skill in the art can appreciate, some embedded system may include more than one computing unit. Additionally, many embedded system operating systems, which may include various features of the present invention, are executable on different embedded system having different computing units therein. Accordingly, an operating point transition constraint description file 305 is identified by an operating point transition constraint module 307.

In various implementations, the operating point constraints include all available operating points and the maximum time to transitions from various operating points to another operating point. The module 307 may identify this information dynamically from the computing unit device driver during operation. Alternatively, the module 307 may identify the operating point transition constraints 305 as provided by a manufacturer of the embedded system, a manufacturer of the computing unit, or a user of the system.

An operation 207 for identifying a set of maximum parking latency parameters for the embedded system is also provided. The system 301 includes a maximum parking latency (MPL) parameter identification module 309 for identifying a set of maximum parking latency parameters 311. In various implementations, the module 309 queries the device drivers for each hardware component in the embedded system to determine the maximum parking latency for each component. In some implementations, selected components are queried. For example, components known to not need synchronization may be excluded. For example, components which are powered off With some implementations, the maximum parking latency parameters are continually updated by the device drivers during operation.

The maximum parking latency parameters may include whether or not the hardware component is responsible for any activity on the buses affected by the transition at this time. For example, if the hardware component is a wireless communication component, then it may be directly accessing memory (DMA), within the embedded system, which is a bus activity. The maximum parking latency parameters may also include a maximum duration of time for which the hardware component is able to pause it bus activity without negatively impacting the system. For example, if the hardware component has a large memory buffer, then it may be able to pause its bus activity for a greater period of time than it would without the large memory buffer. The maximum parking latency parameters may also include the maximum time required to pause bus activity and the maximum time required to resume bus activity.

The method 201 further includes an operation 209 for determining an order of pausing bus activity. More specifically, which hardware component should seize bus activity and in which order is determined. Also, an operation 211 for determining an order of resuming bus activity is determined. In various implantations, the order is determined based upon the amount of time that each hardware component can stay off the bus. More specifically, the hardware component that has the lowest maximum duration of time for which bus activity can be paused in ordered last in line to pause and first in line to resume. In other implementations, an optimization algorithm may be utilized to determine an optimum ordering based on the maximum parking latency parameters and the operating point transition constraints. For example, it may be more desirable (i.e. optimum) to order a hardware component with a very short time required to pause bus activity to cease bus activity after a component that has a longer time required to pause bus activity. Those of skill in the art will appreciate that various optimization methods exist that can take into account the various available parameters and determine and "optimum" ordering. What is meant here by an optimum ordering is that the given operating point transition constraints and maximum parking latency parameters are satisfied. More specifically, that the ordering allows the transition to be successful.

The system 301 includes a transition order determination module 313, which may be configured to determine an ordering of hardware components for the transition as described above. Subsequently, the method 201 includes an operation for initiating the transition. As can be see, the system 301 includes a transition coordination module 315 which may be configured to imitate the transition and cause each hardware component to pause and then subsequently resume in the predetermined order.

Operating Point Transition Synchronization Simulation

Figure 4:
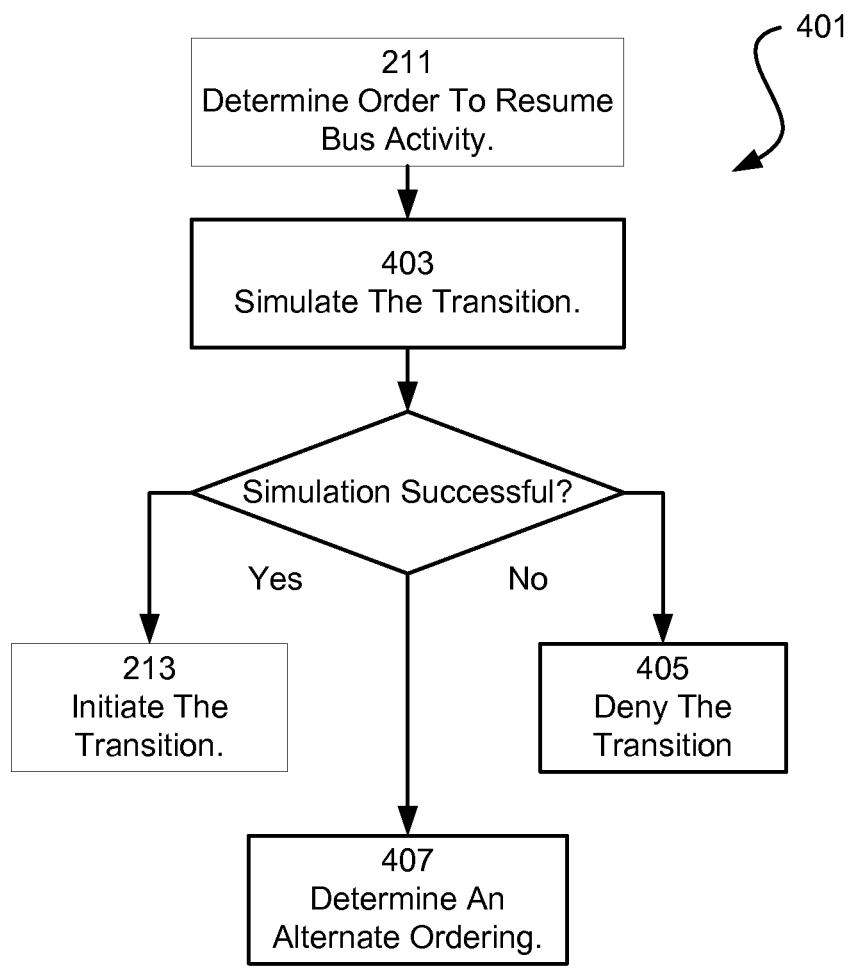
FIG. 4 illustrates a method of simulating an operating point transition.
Figure 5:
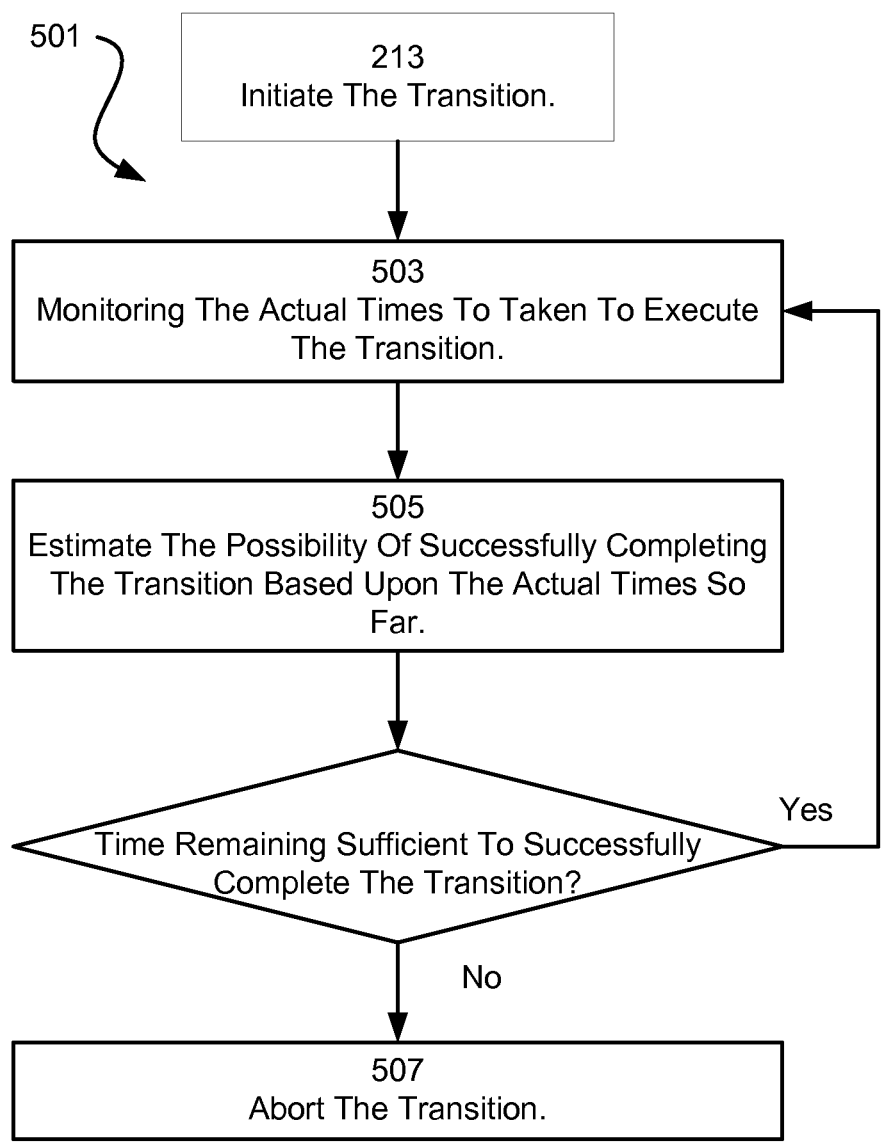
FIG. 5 illustrates a method of determining the change of successfully completing an operating point transition.

Various implementations of the invention may optionally include a synchronization simulation component. FIGS. 4 and 5 illustrate option operations that may be provided and implemented in conjunction with the method 201 shown in FIG. 2. Reference to FIGS. 2, 3, 4, and 5 will be made below in describing various illustrative implementations.

As can be seen from FIG. 4, a method 401 is shown, which may be inserted between the operations 211 and 213. The method 40 includes an operation 403 for simulating the transition based upon the determined ordering and the "worst-case" operating point transition constraints and maximum parking latency parameters. More specifically, the maximum time to cease and then subsequently resume bus activity for each hardware component may be factored into a simulation of the transition. The system 301 may include a transition synchronization module 317 configured to simulate a transition as described above.

Subsequently, based upon the simulation performed by the operation 403, the transition may be initiated by the operation 213 if the simulation indicated that the transition will be successful. Alternatively, if the simulation indicates the transition will fail, then an operation 405 for denying the transition may be provided. Alternatively still, if the simulation indicates that the transition may fail, then an operation 407 for determining an alternate ordering may be provided. More specifically, the method 201 may be directed to return to the operation 209 and proceed again from there.

With some implementations, the method 201 may also include a transition monitoring component as shown in FIG. 5. As can be seen from this figure, a method 501 for monitoring an operating point transition is provided. This method may be appended to the method 201 and used to monitor the success of the actual transition. The method 501 includes an operation 503 for monitoring the actual times used to execute the transition. More specifically, the times for each hardware component to cease and then resume bus activity will be monitored. Subsequently, an operation 505 is provided for estimating, based on these actual times and the possibility of successfully completing the transition. The operation 505 may be similar to the operation 403 for simulating the transition described above. More specifically, portions of the transition which have not yet occurred may be simulated to determine if there is sufficient time to complete the balance of the transition. If it is determined that the transition will not complete successfully, then an operation 507 for aborting the transition is provided. Alternatively, the method 5012 may repeat from the operation 503 as shown.

CONCLUSION

Although certain devices and methods have been described above in terms of the illustrative embodiments, the person of ordinary skill in the art will recognize that other embodiments, examples, substitutions, modification and alterations are possible. It is intended that the following claims cover such other embodiments, examples, substitutions, modifications and alterations within the spirit and scope of the claims.

What is claimed is:

1. A method for synchronizing an operating point transition comprising:
   identifying, by an embedded system, an upcoming operating point transition for a processing unit;
   identifying, by the embedded system, multiple hardware components connected via a bus to the processing unit;
   determining, by the embedded system, operating point transition parameters, wherein the operating point transition parameters include a maximum time required to transition from a current operating point to the upcoming operation point;
   determining, by the embedded system, maximum parking latency parameters for the hardware components;
   determining, by the embedded system, an ordering of hardware component synchronization; and
   implementing, by the embedded system, the transition based upon the determined ordering.

2. The method recited in claim 1, wherein the processing unit is comprised within the embedded system.

3. The method recited in claim 2, wherein the operating point transition is initiated by a user of the embedded system.

4. The method recited in claim 2, wherein the operating point transition is initiated by a software program executable on the embedded system.

5. The method recited in claim 1, the method act for determining the operating point transition parameters including:
identifying, by the embedded system, a device driver for the processing unit; and
extracting, by the embedded system, the maximum time required to transition from the current operating point to the upcoming operating point from the device driver.

6. The method recited in claim 1, wherein the maximum parking latency parameters include a maximum amount of time that each of the hardware components is configured to suspend activity on the bus.

7. The method recited in claim 6, the method act for determining maximum parking latency parameters for ones of the plurality of hardware components comprising:
identifying, by the embedded system, device drivers for each of the hardware components; and
extracting, by the embedded system, the maximum amount of time that the hardware components is configured to suspend activity on the bus from the device drivers.

8. The method recited in claim 7, wherein the maximum parking latency parameters further include:
an amount of time for each of the hardware components to pause activity on the bus; and
an amount of time for each of the hardware components to resume activity on the bus.

9. The method recited in claim 6, wherein implementing the transition based upon the determined ordering satisfies maximum parking latency parameters within the operating point transition parameters.

10. An embedded system comprising:
a processing unit;
multiple hardware components electrically connected to the processing unit via a bus; and
a memory storing a set of instructions configured to cause the processing unit to perform operations comprising:
identifying an upcoming operating point transition for the processing unit;
determining operating point transition parameters including identifying a device driver for the processing unit, and extracting a maximum time required to transition from a current operating point to the upcoming operating point from the device driver, wherein the operating point transition parameters include the maximum time required to transition from the current operating point to the upcoming operation point;
determining maximum parking latency parameters for the hardware components;
determining an ordering of hardware component synchronization; and
implementing the transition based upon the determined ordering.

11. The embedded system recited in claim 10, wherein the operating point transition is initiated by a user of the embedded system.

12. The embedded system recited in claim 10, wherein the operating point transition is initiated by a software program executable on the embedded system.

13. The embedded system recited in claim 10, wherein the maximum parking latency parameters include a maximum amount of time that each of the hardware components is configured to suspend activity on the bus.

14. The embedded system recited in claim 13, wherein determining the maximum parking latency parameters comprising:
identifying device drivers for each of the hardware components; and
extracting the maximum amount of time that the hardware components are configured to suspend activity on the bus from the device drivers.

15. The embedded system recited in claim 14, wherein the maximum parking latency parameters further include:
an amount of time for each of the hardware components to pause activity on the bus; and
an amount of time for each of the hardware components to resume activity on the bus.

16. The embedded system recited in claim 14, wherein the determined ordering is made such that the maximum parking latency parameters are satisfied within the operating point transition parameters.

17. An apparatus comprising at least one computer-readable memory device storing instructions configured to cause an embedded system to perform operations comprising:
identifying an upcoming operating point transition for a processing unit;
determining operating point transition parameters including a maximum time required to transition from a current operating point to the upcoming operation point;
determining maximum parking latency parameters for multiple hardware components;
determining an ordering of hardware component synchronization; and
implementing the transition based upon the determined ordering.

18. The apparatus of claim 17, wherein determining the operating point transition parameters further comprises:
identifying a device driver for the processing unit; and
extracting the maximum time required to transition from the current operating point to the upcoming operating point from the device driver.

19. The apparatus of claim 17, wherein the maximum parking latency parameters include a maximum amount of time that each of the hardware components is configured to suspend activity on the bus.

20. The apparatus of claim 17, wherein the maximum parking latency parameters further include:
an amount of time for each of the hardware components to pause activity on the bus; and
an amount of time for each of the hardware components to resume activity on the bus.

* * * * *